June 13, 1944. H. F. WILHELM 2,351,175
WIRE SAWING
Filed July 13, 1939 2 Sheets-Sheet 2
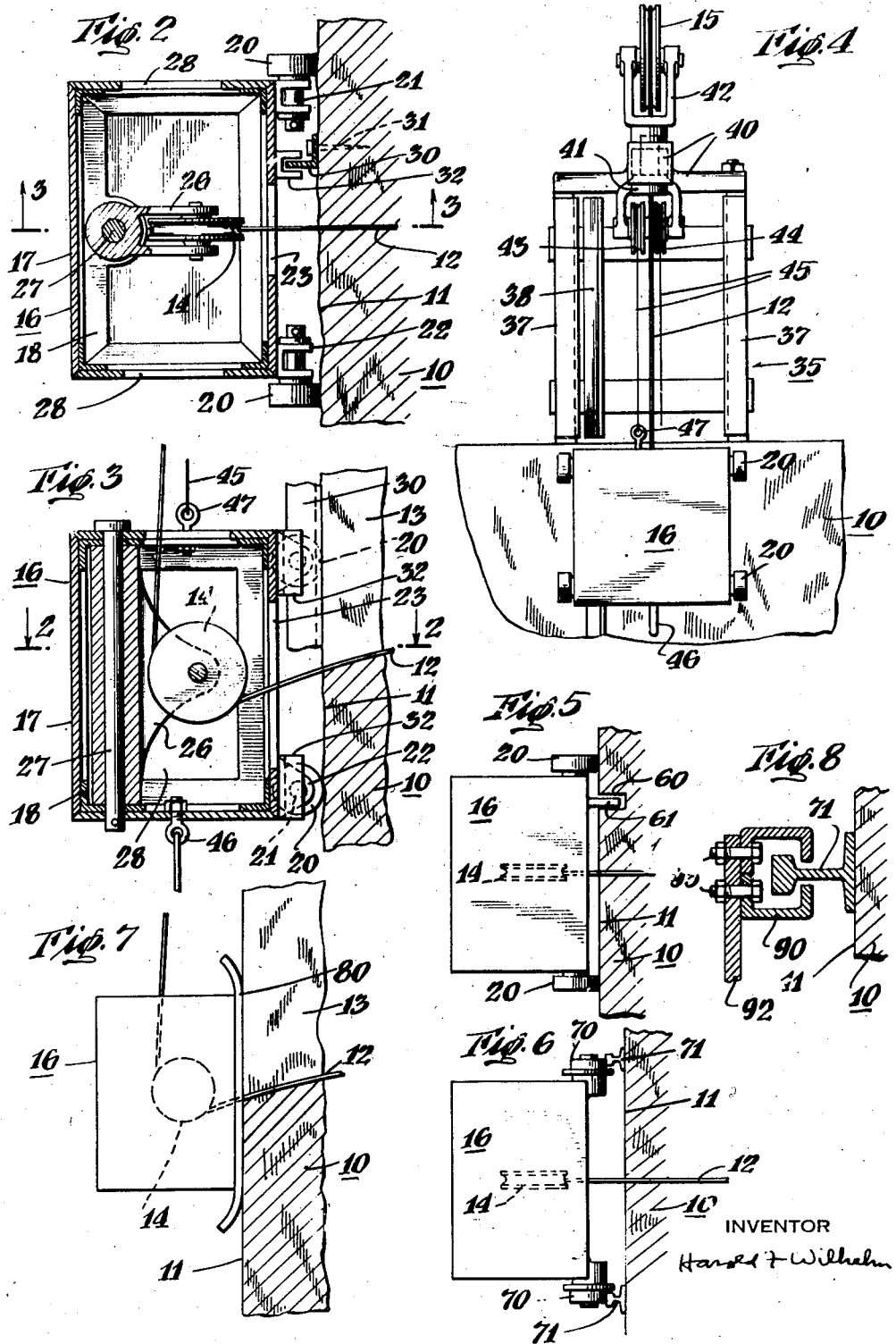
INVENTOR
Harold F. Wilhelm Patented June 13, 1944

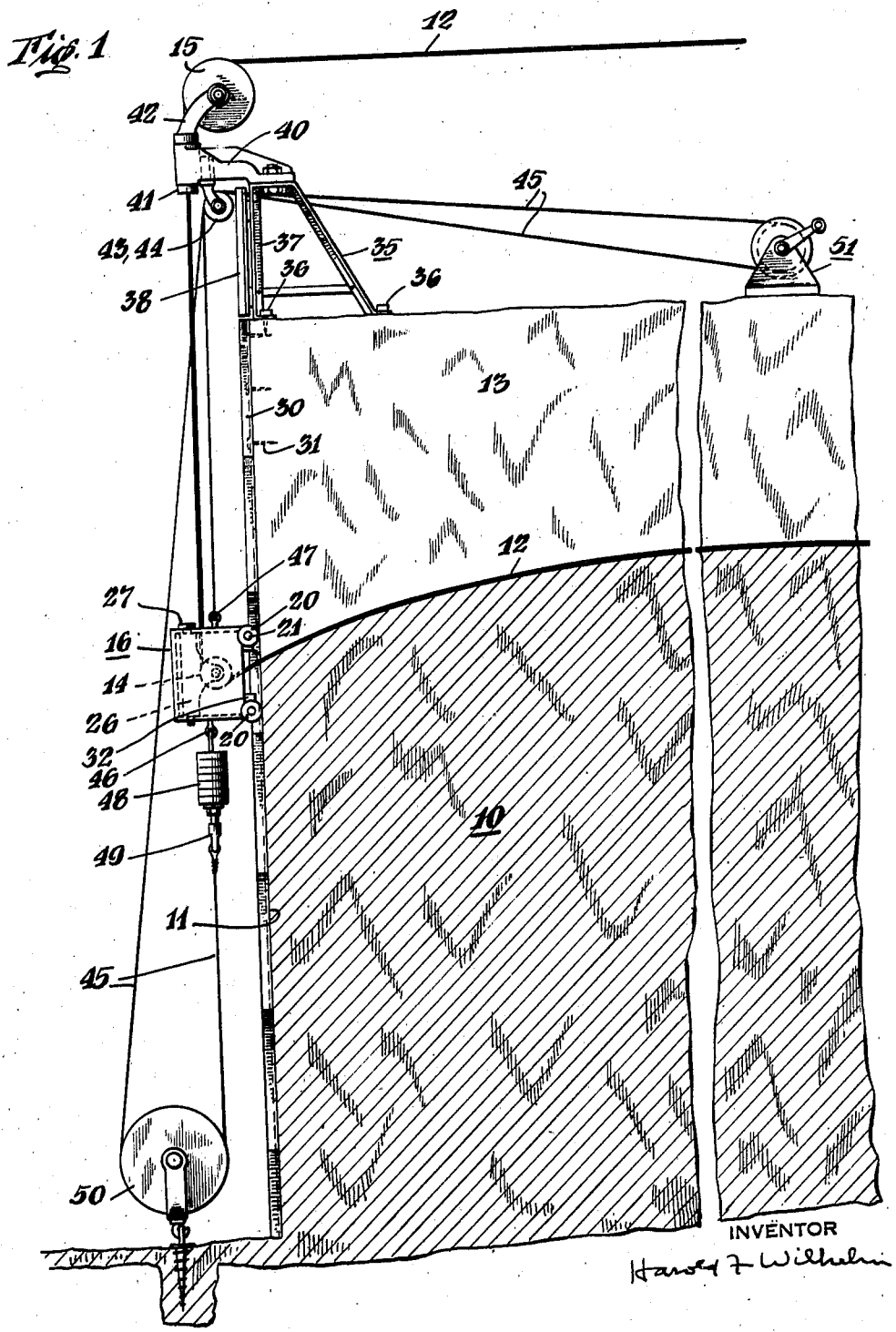

2,351,175

UNITED STATES PATENT OFFICE 2,351,175

WIRE SAWING

Harold F. Wilhelm, Orange, N. J.

Application July 13, 1939, Serial No. 284,205

7 Claims. (Cl. 262—28)

The invention relates to quarrying by use of wire saws and, more particularly, to the elimination of wire saw standards.

The invention constitutes an improvement over, but is not limited to, the method disclosed in Newsom Patent No. 2,050,761, granted August 11, 1936.

In the past, to make vertical wire saw cuts, either according to the aforesaid patent or according to older methods, it has been common to use so-called standards. These standards are heavy structural steel members having guides upon which slide blocks for carrying the wire saw supporting sheaves. Now these standards have certain inherent disadvantages, particularly for deep cuts. The disadvantages arise not only from the difficulty of handling due to their weight and bulk, which requires heavy lifting machinery, but also from difficulties in accurately positioning and maintaining position of the standards.

The present invention overcomes the difficulties of the prior construction by eliminating the standards entirely. The invention utilizes the face of the ledge as a runway and runs a slidable or rolling shoe or carrier over this runway and utilizes the tension of the wire saw to hold the shoe in place. The shoe may be supported in direct contact with the open side face of the ledge, or track members may be applied to the side face of the ledge. In any case, the ledge itself takes the stress applied to the shoe by the wire saw. Suitable guide devices may be provided for guiding the shoe along the desired path, either forming part of the track members or separate therefrom. The guide and track members, if used, may be of relatively short lengths and of comparatively light stock so they may be positioned by the use of a small hand derrick which may also be utilized for starting the shoe when beginning a new cut.

The invention also consists in certain new and original features of construction and combination of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a more or less diagrammatic section through a ledge, illustrating the invention;

Fig. 2 is a horizontal section taken on the line 2—2 of Fig. 3 showing one form of shoe and guide arrangement;

Fig. 3 is a vertical section on the line 3—3 of Fig. 2;

Fig. 4 is a side elevation showing a combined starting frame and derrick;

Fig. 5 is a modification showing a guide groove cut in the ledge face;

Fig. 6 is another modification showing the shoe riding on tracks;

Fig. 7 is another modification using runners instead of wheels and showing no guideway of any kind; and Fig. 8 illustrates a special guiding arrangement for preventing the shoe from swinging away from the ledge when there is no tension on the wire saw.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now more particularly to Fig. 1, the ledge is indicated by 10 and has an open vertical working face indicated by 11, which has been previously cut, preferably by a wire saw so that it is relatively smooth. The wire saw itself is indicated by 12 and is located at the bottom of the cut 13 in the process of being made. The wire saw 12 runs around sheave 14 located on shoe 16 and sheave 15 located on derrick 35 to suitable driving apparatus, omitted for purpose of simplicity. The sheave 14 located on shoe 16 may be called a feed sheave since it supplies cutting pressure to the wire saw, as distinguished from sheave 15 which is merely a guide or supporting sheave.

It will be understood that the general arrangement of wire saw, feed sheaves and guide sheaves may be similar to that of the above-mentioned Newsom patent and that a shoe similar to that indicated by 16 in Fig. 1 may be used on the opposite face of the ledge 10 in the same way as illustrated here.

Referring now also to Figs. 2 and 3, the shoe 16 may comprise a suitable structural framework made up of plates indicated in general by 17, reenforced by corner angle irons indicated in general by 18, and suitably welded or otherwise secured to form a rigid structural carrying member.

For slidably mounting the shoe 16 against the side face 11, four rollers or wheels 20 may be provided, one at each corner of the shoe. These rollers 20 may be mounted on suitable axles 21 secured to suitable U-shaped members 22 secured to the base plate 23 of the shoe.

The wire supporting sheave 14 is journalled on a bracket 26 swiveled by a bolt 27 passing through the top and bottom of the shoe. It will be understood that suitable hand openings indicated by 28 may be provided in the sides of the shoe 16 to lighten the construction and permit passage of the wire saw 12 and also permit access to the sheave bearings for lubrication or other purposes.

If desired, for guiding the shoe in a straight path, a guideway 30 may be provided. The guideway may be of relatively short lengths, say, three to six feet, of light angle iron construction. The members 30 may be secured directly to the open face 11 of the ledge by ordinary bolts 31 usually used for securement to stone. The shoe 16 may have one or two channel-shaped members 32 loosely fitting around the guideway 30 for guiding the shoe along a straight path.

For making the vertical cut 13, it will be understood that the line of guideway 30 must be in a plane parallel to the plane of the cut, but it is immaterial whether the guideway 30 lies in a vertical line or even in a straight line as the cut face 11 of the ledge may be neither plane nor vertical.

For supporting and starting the shoe, a light frame indicated in general by 35 is provided. This frame may be light enough to be moved about by two men or, if desired, the structural members thereof may be unbolted so it may be easily dissembled and set up for a new cut. The frame 35 will be held down to the ledge by suitable hold down bolts 36. At its front face it is provided with a pair of track members 37 and a guide member 38. The track members 37 are coextensive with the side face 11 of the ledge and the guide member 38 is coextensive with the guide members 30. Thus, the wheels 20 of the shoe may be supported against the tracks 37 and the guide channels 32 positioned by the guideway 38 when the wire saw 12 is at the top of the ledge beginning a cut.

The frame 35 supports a bracket 40 in which is swivelled a lower bracket 41 and an upper bracket 42. The upper bracket 42 journals the sheave 15 which supports the wire saw 12. The lower bracket 41 journals a pair of independently rotatable pulleys 43 and 44, over which the control line 45 passes.

The shoe 16 has a lower eye bolt 46 and an upper eye bolt 47. Suitable removable and replaceable weights 48 may be secured to the lower eye bolt 46 for supplying the necessary cutting pressure to the saw 12. A further eye bolt 49 is secured to the lower end of the weight assembly 48 and secured to the control line 45 which passes around a pulley 50 journalled at the bottom of the ledge.

The control line 45 passes to a suitable winch 51, indicated as a hand winch, having two drums, upon one of which one end of line 45 winds, while the other end unwinds, and vice versa. Thus, by turning winch 51, the position of shoe 16 may be adjusted and, if desired, the winch may be used to exert downward pull on shoe 16 to provide cutting pressure on wire saw 12, in which case the weights 48 may be omitted. It will be understood that the winch 51 may be located at a central position so that it may cooperate with frame 35 as it is set up in successive positions across the ledge for making new vertical cuts, without requiring the winch 51 to be moved each time.

Referring now to Fig. 5, in some cases it may not be desired to use a guide rail 30. In this case a vertical guide groove, indicated by 60, may be cut in the ledge face and the shoe 16 may have a vertical guide flange 61 running in groove 60. The groove will extend all the way from the top to the bottom of the ledge or, as far as it is desired to cut, and may be cut in the ledge by a suitable grind wheel, for example.

Referring now to Fig. 6, in some cases, tracks 71 may be provided. These tracks may be of relatively light railway rails, such as used in mines, and of lengths easily handled. These tracks 71 will be held to the side face by suitable holding bolts, and the four wheels 70 will be flanged, as will be understood by those skilled in the art. This form is especially advantageous where the side wall 11 is rough or where it is stepped as when cut by a channeler. The tracks 71 will bridge any steps or uneven spots in the wall, being supported, if necessary, by wedges or blocks between the wall 11 and the tracks, although, as stated above, the path of the shoe may wave or undulate so long as it remains in a plane parallel to the plane of the cut. The tracks 71 thus may follow the general contour of the open working face 11, being attached at close intervals to the face 11 and backed and supported by the ledge throughout their length.

As shown in Fig. 7, instead of using rollers or wheels, the shoe may be provided with sled runners 80 adapted to slide against a relatively smooth face of the ledge. These runners 80 may be used with or without a guide rail 30 or guide groove 60. In case the guideway is entirely dispensed with, the tension of control line 45 is used exclusively for guiding the shoe in a straight path.

In some cases, it may be desirable to provide some sort of holding device to prevent the shoe or carrier from swinging away from the ledge face when tension is removed from the saw, as when a saw breaks or before the saw wire is run over the carriers and pulleys. In Fig. 8 a holding device made up of bent straps 90 is illustrated.

This particular holding device is adapted for use with the rails shown in Fig. 6. The device 90 engages under the head of the rails 71 and one or more such devices may be used with each rail. They may be removably secured by bolts 93 to brackets 92 attached to the shoe and are split to facilitate engaging the rails.

Thus, a system of wire sawing is disclosed which eliminates heavy standards and the attendant disadvantages of moving them about and lining them up. Furthermore, no large derrick is needed for setting up the wire saws and only a small, relatively light frame 37 is required. It will be understood that with the forms shown in Figs. 5, 6 and 7, the tracks and guideway on the frame 37 will be changed accordingly.

If desired, the shoe 16 itself may be used as an elevator to support the workman who grinds the groove 60 into the ledge or who positions the guide strips 30 or tracks 71. These guide strips and tracks, being of relatively light metal, are easily handled and require only relatively small bolts to hold them in position. In order to cut down servicing of the various pulleys and sheaves, oilless self-lubricating bearings may be used, thus permitting deep cuts to be made without requiring any servicing for lubricating the pulleys or sheaves.

It will be seen that in operation the shoe or carrier is subjected to two main forces, one, the tension of the wire saw 12 and, two, the cutting pressure applied by weights 48 or by line 45. The resultant of these forces acts against the face of the ledge. In positioning the sheave 14 on the shoe 16 and determining the area of the base 23 and the position of its supporting rollers or runners, care must be taken to position the sheave 14 sufficiently within the confines or wheel base of the shoe so that the position of the shoe will be stable, that is, so that the shoe will not rotate or tip with respect to the ledge face with change in the amount of tension on the saw 12 or the cutting pressure. To accomplish this result, the resultant pressure applied to the shoe must be imparted to the ledge within the confines of the points where the shoe or carrier engage the ledge face or tracks.

Thus, a system is provided in which the sheave carrier or shoe is self supporting in that it is held in position by the wire saw 12 and the shoe will not tip with respect to the face on which it moves. In all cases a runway having a tread surface is provided for supporting the shoe and the thrust thereof. The tread receives substantially continuous support from the ledge whether the face of the ledge provides the runway directly or whether the tracks are used. The runway is also provided with a guide surface either in the form of a groove in the ledge or of a rail secured to the face of the ledge; or guide action may be obtained by the tension of line 45.

While certain novel features of the invention have been disclosed and are pointed out in the annexed claims, it will be understood that various omissions, substitutions and changes may be made by those skilled in the art without departing from the spirit of the invention.

What is claimed is:

1. In a wire sawing system for sawing a ledge having an open working face, a track comprising a pair of spaced running rails on said working face and receiving support therefrom at closely spaced points, a shoe having flanged wheels rolling on said track, a sheave on said shoe, a wire saw passing around said sheave and located in its cut in the ledge, and driving apparatus secured to said wire saw.

2. In a wire sawing system for sawing a ledge having an open working face, a track of running rails following the general contour of said open working face and extending in the direction of the depth of the cut to be made, said track receiving backing from said face at close points substantially the entire extent of the track, a shoe having wheels rolling on said rails, a sheave journalled on said shoe, a wire saw passing around said sheave and located in its cut in the ledge, and driving apparatus secured to said wire saw, the tension of said wire saw holding said wheels against said rails.

3. In a wire sawing system for a ledge having a generally flat, open working face, a runway on said open working face extending continuously in the direction of the depth of the cut, said runway following the general contour of said face regardless of the shape of the contour of said face, said runway throughout its entire length being substantially continuously backed by the rock of said ledge, a shoe riding on said runway, means for guiding said shoe along said runway, a sheave journalled on said shoe, a wire saw passing around said sheave and located in its cut in the ledge, driving apparatus for said wire saw, and means for applying cutting pressure on said shoe, whereby said shoe is held stable against said runway by the tension of said wire saw and by said cutting pressure.

4. In a wire sawing system for a ledge having a generally flat, open working face, a runway on said open working face extending continuously in the direction of the depth of the cut, said runway following the general contour of said face and being substantially continuously backed by the rock of said ledge, a shoe riding on said runway, means for guiding said shoe along said runway, a sheave journalled on said shoe, a wire saw passing around said sheave and located in its cut in the ledge, driving apparatus for said wire saw, means for applying cutting pressure on said shoe, whereby said shoe is held stable against said runway by the tension of said wire saw and by said cutting pressure, said ledge also having a starting face extending transversely of said open working face, a starting frame secured to said starting face and having a runway coextensive with said ledge runway, said shoe being ridable on said frame runway for starting the cut and on said ledge runway for continuing the cut.

5. In a wire sawing system for a ledge having a generally flat, vertical open working face, a runway on said open working face extending continuously in the direction of the depth of the cut, said runway following the general contour of said face regardless of the shape of the contour of said face, said runway throughout its entire length being substantially continuously backed by the rock of said ledge, said runway having a tread surface and a guide surface, a shoe riding on said runway and having runway-engaging parts engaging said tread and guide surfaces, a sheave journalled on said shoe and located beyond said open working face, a wire saw passing around said sheave and located in its cut in the ledge, driving apparatus for said wire saw, the location at which said wire saw passes from said sheave to said cut being located within the area of contact of said runway-engaging parts with said tread surface, and means for applying cutting pressure on said shoe, whereby said shoe is held stable against said tread surface by the tension of the wire saw and by said cutting pressure as said guide surface guides said shoe along said runway to make the cut.

6. In a wire sawing system for a ledge having a generally flat, open working face, a runway extending continuously in the direction of the depth of the cut, said runway having a tread surface comprising said bare open working face and having a guide surface, a shoe riding on said runway and having parts engaging said tread and guide surfaces, a sheave journalled on said shoe, a wire saw passing around said sheave and located in its cut in the ledge, driving apparatus for said wire saw, and means for applying cutting pressure on said shoe, whereby said shoe is held stable against said tread surface by the tension of said wire saw and by said cutting pressure.

7. In a wire sawing system for a ledge having a generally flat, open working face, a runway on said open working face extending continuously in the direction of the depth of the cut, said runway following the general contour of said face and being substantially continuously backed by the rock of said ledge, a shoe having wheels riding on said runway, means for guiding said shoe along said runway, a support pivoted on said shoe about an axis extending in the same general direction as said runway, a sheave journalled on said support and located beyond said open working face, a wire saw passing around said sheave and located in its cut in the ledge, driving apparatus for said wire saw, the location at which said wire saw passes from said sheave to said cut being located within the area of contact of said wheels with said runway, and means for applying cutting pressure on said shoe, whereby said shoe is held stable against said runway by the tension of said wire saw and by said cutting pressure.

HAROLD F. WILHELM.